Sept. 11, 1962   F. M. GALLOWAY   3,053,724
METHOD OF SPLICING SECTIONS OF HEAVY DUTY DISCHARGE HOSE
Original Filed Jan. 31, 1957   3 Sheets-Sheet 1

INVENTOR
FREDERICK M. GALLOWAY
BY
ATTORNEY

Sept. 11, 1962 F. M. GALLOWAY 3,053,724
METHOD OF SPLICING SECTIONS OF HEAVY DUTY DISCHARGE HOSE
Original Filed Jan. 31, 1957 3 Sheets-Sheet 3

INVENTOR
FREDERICK M. GALLOWAY
BY
ATTORNEY 3,053,724
METHOD OF SPLICING SECTIONS OF HEAVY DUTY DISCHARGE HOSE
Frederick M. Galloway, Langhorne, Pa., assignor to H. K. Porter Company, Inc., a corporation of Delaware
Original application Jan. 31, 1957, Ser. No. 637,397, now Patent No. 2,930,406, dated Mar. 29, 1960. Divided and this application Sept. 21, 1959, Ser. No. 841,231
3 Claims. (Cl. 156—258)

This application is a division of my copending application Serial No. 637,397, filed January 31, 1957, now United States Letters Patent 2,930,406.

This invention relates to heavy duty flexible hose known in the trade as "discharge hose" which is used extensively for loading and unloading tanker vessels, refueling oil-fired ships and for overland and under water oil lines, and is particularly directed to a novel splice for such hose whereby sections of the hose may be joined together end to end into a unitary line of any desired length without the use of metallic coupling members.

Hose of the aforesaid character is manufactured by initially wrapping a sheet of uncured rubber stock about a hollow cylindrical mandrel and then successively adding a plurality of plies or layers of textile fabric impregnated with uncured rubber until a desired wall thickness has been built up around the mandrel, then wrapping the outer layer in an outer cover of sheet stock over which a tight spiral of textile tape, which compacts the layers together and subjects them to considerable radial inward pressure, is applied temporarily while the hose is being exposed to heat for curing or vulcanizing the rubber composition. Obviously the length of a single piece of hose made in this way is limited by the length of the mandrel employed and it is the usual practice to use 50' mandrels as the longer ones problems of intermediate support and the like become complicated. It has therefore been necessary when more than about 50' of hose was required in a single line to join together with the aid of metal end couplings the requisite number of shorter hose sections. As the metal end couplings are necessarily heavy they add materially to the average weight per linear foot of the coupled hose line and are often subject to leakage and susceptible of causing damage or being damaged by forces which if applied to the hose as distinguished from the couplings might have little or no injurious effect.

Although it has been considered impractical to produce in hose of this character permanent end splices having sufficient strength to be acceptable to the trade, nevertheless I have devised a splice for such hose whereby two sections may be joined end to end in a manner affording at the splice substantially equal if not greater strength than in the body of the sections themselves and without material thickening of the hose at the splice.

It is therefore a principal object of the invention to provide a method of splicing discharge hose whereby a plurality of individual pieces of hose may be united into a single hose line of desired length and substantially uniform diameter throughout.

Other objects, purposes and advantages of the invention will hereinafter appear or will be understood from the following description of a splice formed in a 6-ply discharge hose of usual character, six being the number of plies of textile fabrics normally employed in making hose of 4" nominal internal diameter, during which the method of making the splice will be explained with reference to the accompanying drawings in which.

Figure 3:
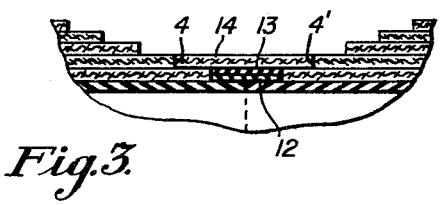
Figure 4:
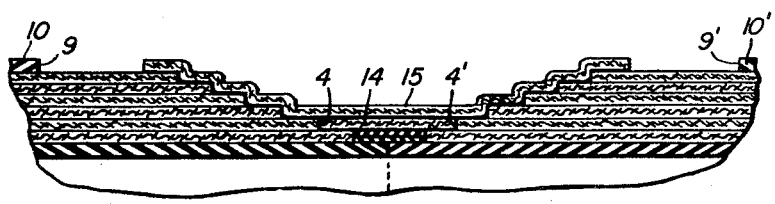
Figure 5:
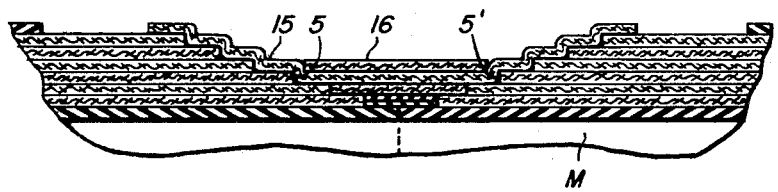
Figure 6:
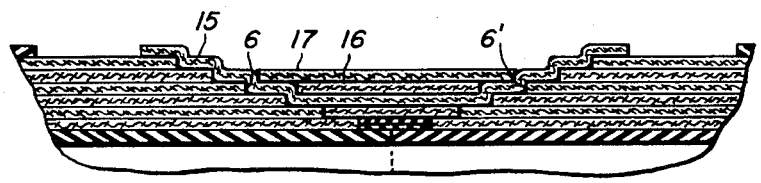
Figure 7:
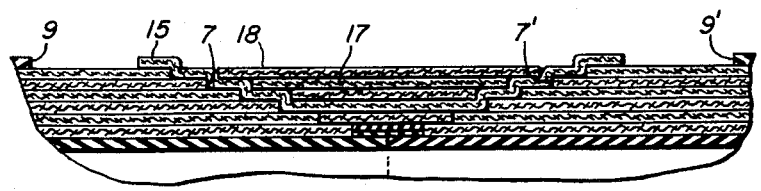
Figure 8:
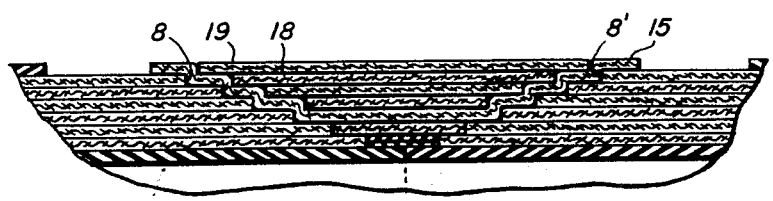
Figure 9:
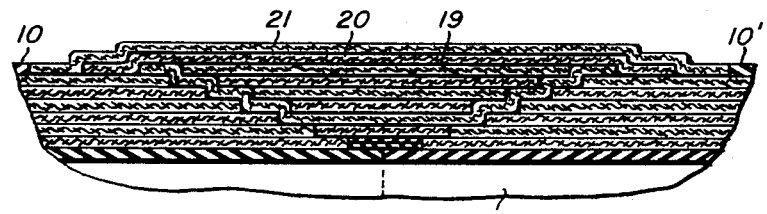
Figure 10:
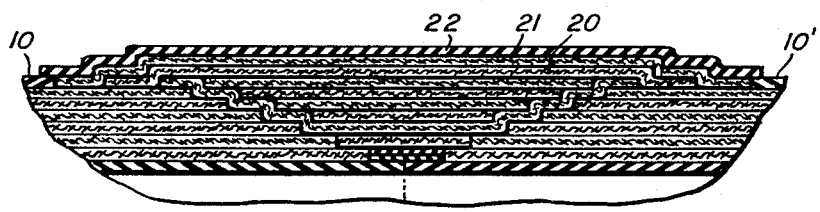
Figure 11:
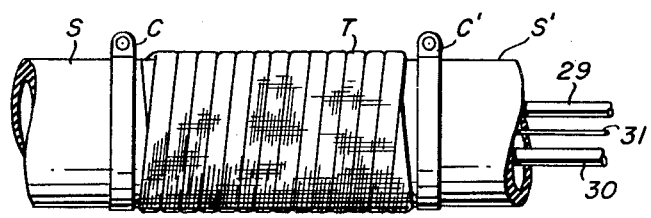
Figure 12:
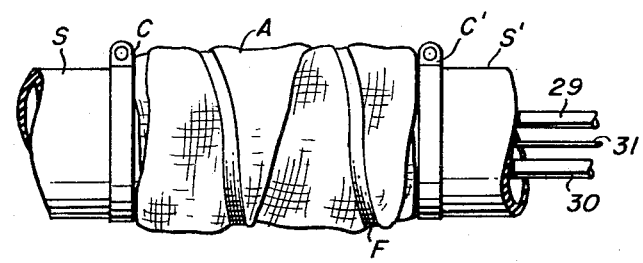
Figure 13:
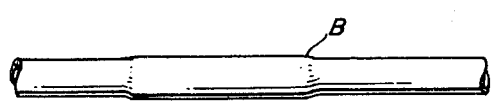

FIG. 3 fragmentarily illustrates the sections after completion of a subsequent step;

FIG. 4 shows the sections after application at the splice of a wrapping overlying the ends of the reinforcing plies of the sections;

FIGS. 5 to 10 inclusive fragmentarily illustrate completion of succeeding steps in making the splice;

FIG. 11 on a scale smaller than the preceding figures shows a step preliminary to vulcanizing the splice after it has been formed;

FIG. 12 on a like scale shows completion of preparations for vulcanizing the splice, and FIG. 13 on a much smaller scale is a side elevation of the splice after it has been made and the spliced hose is ready for service, it being understood that the increased diameter of the hose at the site of the splice is somewhat exaggerated and the thickness of plies of material in the preceding figures is further exaggerated for clearness of illustration.

Referring now more particularly to the drawings it will be understood that the hose sections S, S' to be joined may be of any appropriate character having an inner rubber or comparable tube and, integrally combined therewith, a plurality of plies of rubber impregnated fabric reinforcement which may be the more or less common cotton duck which has long been used in the manufacture of hose of this character, with the warp and filling yarns of the duck laid at about 45° to the axis of the hose. Preferably, however, I employ in the hose itself fabric known as "nylon tire cord fabric" containing about 26 high twist 2-ply nylon yarns to the inch in the warp with a relatively light nylon or cotton filling at about 2½ picks to the inch and of not much greater tensile strength than just sufficient to hold the nylon warp yarns in place during handling and subsequent treatment. In making the hose this fabric, impregnated with a suitable uncured rubber composition, is wound spirally about the inner tube while supported on a mandrel with the spirals of successive layers or plies progressing in mutually opposite directions whereby maximum resistance to radial stress is built into the hose.

To prepare the ends of hose sections S, S' for splicing the sections are first squared off so that the ends 1, 1' of their inner tubes or linings 2, 2' when brought together in matching relation will abut in a plane transverse to the hose axis. Then the cover and the several fabric layers in each section are progressively cut away at successively less distances from this plane to expose the underlying layer, preferably, about 1" to 1¼", the cuts being made in a series of transverse planes. It results the remaining part of the hose section presents a stepped formation as will be apparent from inspection of FIGS. 1–10 in which the thickness of the plies is necessarily exaggerated for clearness of illustration, and the respective steps formed by the longitudinally extending part of each ply and the transverse end face of the next outermost ply are designated generally by a single numerals. Thus steps 3, 3' formed by the inner tubes and innermost fabric plies lie proximate the section ends; steps 4, 4' are next in the series progressing outwardly followed by 5, 5', 6, 6', 7, 7', 8, 8' and finally 9, 9' formed by the ends of the covers 10, 10' and the next subjacent fabric plies, these latter steps being considerably longer than those just mentioned.

Figure 1:
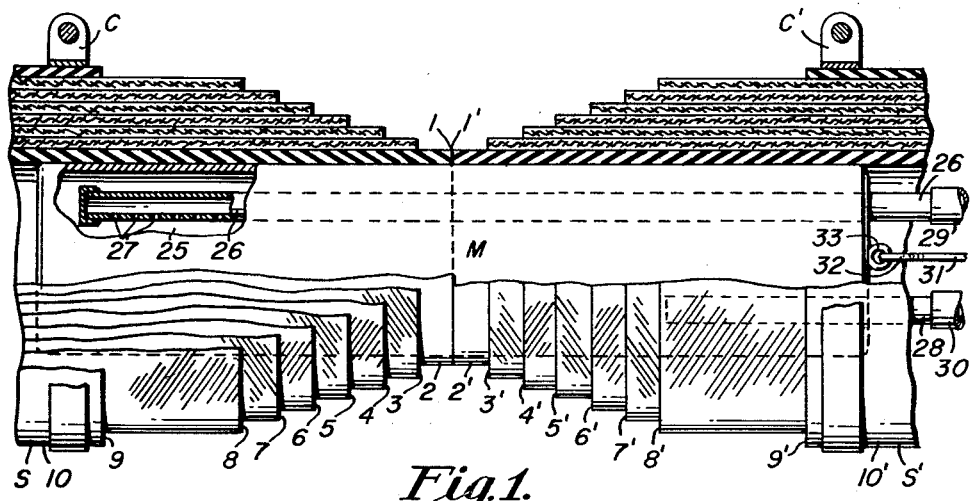
FIG. 1 is a fragmentary composite side elevation partly in radial section of two pieces of hose preparatory to splicing them together, the ends of the pieces or sections which have already received preliminary preparation for splicing being disposed on a mandrel of novel construction desirably utilized as an aid in making the splice.
Figure 2:
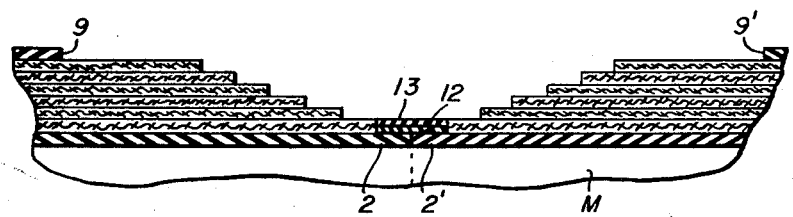
FIG. 2 is a fragmentary section diagrammatically showing the hose sections after completion of the first step in joining them together in a splice, illustration of the mandrel being omitted from this and the succeeding several figures.

When all the said steps have been formed the sections are brought together in coaxial relation with ends 1, 1' abutting and circumferential clamps C, C', previously slipped over the ends of the sections, are set up to hold them on a mandrel M hereinafter more fully described; steps 9, 9' in the outer covers then should be about 18" apart in 4" 6-ply hose. With the sections thus assembled as shown in FIG. 1 on mandrel M the mandrel having first been coated with a suitable lubricant such as silicone mold lubricant and ends 1, 1' of the inner liners 2, 2' with a suitable uncured rubber cement, which should be dried at least to tackiness before the ends are brought together, two layers 12, 13 of rubber impregnated ⅜" nylon tape are wrapped tightly about the center of the joint to substantially fill in the space between steps 3, 3' and adhered to liners 2, 2' and to each other by a suitable cement (FIG. 2). Next a layer 14 of rubber impregnated tire cord fabric tape cut on a bias of about 54° is laid about tape layer 13 between steps 4, 4' so that the nylon warp yarns form about 54° angles to the mandrel axis and the tape edges just abut said steps (FIG. 3). After the rubber impregnated fabric is applied, it and the remaining exposed cut-away surfaces of the sections are coated with rubber cement which is allowed to dry; a sheet of bias-cut impregnated cord fabric 15 similar to the fabric of tape 14 and having its warp yarns extending at a like angle to the mandrel axis (FIG. 4) is now disposed about the entire surface exposed between steps 8, 8' and for a short distance along steps 9, 9' toward the ends of covers 10, 10' with its warp yarns extending at bias angularity opposite that of warp yarns of layer 14 and cement is then applied to its outer face for reception of subsequent layers, each of the latter in turn being likewise outwardly coated with cement prior to receiving a succeeding overlying layer.

Sheet 15 thus covers all the steps formed at the ends of the cut-away fabric layers but through its close adherence to the subjacent material its outer surface exhibits a series of generally corresponding steps (FIG. 4) and the longitudinal spaces between them are now filled in as follows: First, an impregnated bias-cut fabric layer 16 preferably with its warp extending angularly with respect to the warp in sheet 15 and of a width just to fill remaining spaces between steps 5, 5' is applied (FIG. 5) and in like manner succeeding layers of bias-cut fabric 17, 18, 19 are supplied to fill the spaces between steps 6, 6' (FIG. 6); 7, 7' (FIG. 1) and 8, 8' (FIG. 8) respectively; as noted, if tire cord fabric is used the warp yarns therein extend alternately in right and left hand spirals in the successive layers. Thus it will be seen that the direction of the warp yarns, which corresponds to the direction of greatest tensile strength of the fabric, in successive layers is disposed alternately at positive and negative angles of 54° to the axis of the splice.

Finally, outer layers of bias-cut fabric 20, 21 (FIG. 9), the outer one spanning the space between steps 9, 9' formed by the covers, followed by a slightly longer rubber covering sheet 22 (FIG. 10) are disposed about the entire assembly and successively cemented in place to supplement the previous layers and enable a smooth outer surface to be formed.

It will be observed there now is a slight tapering radial enlargement of the hose at the splice, but if the latter is carefully made this bulge (exaggerated at B in FIG. 13) may be kept so small as to be virtually unnoticeable after the splicing materials have been cured as now to be described.

To this end the entire splice is spirally wrapped tightly with nylon or similar strong tape T (FIG. 11) preferably treated so as not to adhere permanently to the rubber cover of the hose or splice after vulcanization. This tape exerts considerable radial inward pressure, thereby compressing the splice about mandrel M and compacting its several layers together; over it a blanket of insulating abbestos cloth A is next positioned and held in place by friction tape F or other temporary securing means (FIG. 12) the function of this blanket being to prevent excessive radiation from the splice of heat applied to it in the vulcanizing step.

At this juncture the specific character of mandrel M becomes of significance whereas during the operations thus far described it has functioned merely as a supporting member for the hose sections. As best illustrated in FIG. 1 the mandrel is primarily a hollow closed end cylinder providing a chamber 25; at the junctions of the cylinder ends and body it is slightly relieved to facilitate its passage into and from the hose sections. From one end of the mandrel a capped pipe 26 extends into the chamber parallel to the mandrel axis but offset therefrom and is perforated to form a plurality of spaced jet outlets 27 disposed from end to end of that portion which is within the chamber. Pipe 26 thus constitutes a duct for introduction of high pressure steam into the latter; a shorter pipe 28 entering the chamber from the same end as the inlet duct and constituting an exhaust duct for such steam is disposed oppositely with respect to the mandrel axis from the inlet duct.

Steam ducts 26, 28 are connected with flexible hoses 29, 30 extending through one of the hose sections to and beyond its remote end where they are in turn connected respectively to suitable source and discharge conduits (not shown). A cable 31 introduced and substantially coextensive with these hoses is secured to the mandrel through a hook 32 engaging an eye 33 located at the center of the mandrel head.

As suggested above, after the splice has been formed up and prepared for curing by application of tape T for maintaining pressure against it and blanket A for minimizing escape of vulcanizing heat, dry steam preferably at about 80 p.s.i.g. is introduced through duct 26 to mandrel chamber 25 and circulated therethrough to exhaust duct 28 for a suitable curing period, such as for 2½ hours, a control valve or the like (not shown) being provided at a convenient point in the steam exhaust hose 30 to so regulate the exhaust as to insure adequate heating of the mandrel by the steam supplied to it. Upon completion of the vulcanizing the steam is shut off and the temporary wrappings removed from the splice, artificial cooling with a water spray being utilized if desired, and the mandrel then with the aid of cable 31 is withdrawn from the section of hose through which the cable and steam hoses were passed at the start of the operation which is now complete.

It is thus evident that by repeating the splicing operation at successive ends a hose of any desired length can be produced without couplings of any kind and as substantially a single integral length, the slight bulges on the exterior resulting from the splicing being normally unobjectionable; moreover and as the material incorporated in the splice becomes part of the hose the splice exhibits substantially the same uniformity in flexibility as the unspliced portion of the hose.

It will be evident from the foregoing that with the aid of my splice and method of making it composite hoses of indefinite length can be produced from relatively short sections without the use of end coupling members which have heretofore been required for producing them. In consequence the weight of a given length of hose can be substantially reduced and as its outer surface at the splices is substantially continuous with that between two splices there are no projections thereon to encounter obstructions, become fouled in other gear or cause injury thereto as is a common occurrence when a plurality of coupled lengths are being handled or used, while the splices with substantially the same flexibility as the remainder of the hose permit the latter to be reeled compactly and uniformly for storage or shipment. Furthermore since the hose at the splices has strength equal to or greater than that of other portions, the risk that a line may part or leak while in service, with resultant loss of oil or other liquid being delivered therethrough, is substantially eliminated as compared with that of hose lines constructed by fastening together a plurality of short sections with the aid of metallic end couplings which, as is well known, tend to separate from the hose setcions, to leak at the joint at which two are brought together and to be damaged or fail from impact.

While I have herein described with considerable particularity one embodiment of my invention and explained the practice of my method of splicing discharge hose and the like, it will be understood I do not desire or intend thereby to be limited or confined in any way as changes in the form, composition, character and relationship of the several components and parts thereof entering into the splice as well as in the several steps in the method of producing it will readily occur to those skilled in the art and may be utilized if desired without departing from the spirit and scope of the invention as hereinafter claimed.

Having thus described my invention, I claim and desire to protect by Letters Patent of the United States:

1. The method of splicing multiple ply fabric reinforced hose sections which comprises removing the outer cover from each section for an appreciable distance longitudinally from the end to be spliced, then successively removing from each section for progressively less distances from said end successive inner plies of fabric until all that remains of the section immediately adjacent said end is the inner rubber tube of the hose section, positioning the sections with the tubes in abutting end to end relation on a cylinderical mandrel, applying to said tubes a binding of tape spanning the abutment of their ends, applying over said binding a wrapping of fabric impregnated with a vulcanizable rubber composition extending axially from the end of the innermost ply of fabric of one section to the end of the corresponding ply of fabric of the other section, said fabric comprising warp yarns disposed in said wrapping respectively at an angle of approximately 54° to the common axis of the tubes, then enclosing the entire exposed surfaces of the sections between the ends of their outer plies in a rubber impregnated fabric sheet comprising warp yarns disposed at a substantially similar angle to said axis, then successively applying additional wrappings of simliarly impregnated fabric extending axially between successive steps formed in said sheet by the successive ends of the plies of the sections until a layer of said fabric corresponding to each ply of the hose sections has been applied, each of the several wrappings comprising warp yarns disposed alternately in successive wrappings at positive and negative angle of approximately 54° to said common axis, and filler yarns in each wrapping extending substantially normal to the warp yarns therein, then enclosing the wrappings of the abutted hose sections in a sheet of vulcanizable rubber composition extending axially between the outer surfaces of the sections to form a spliced assembly of abutted hose sections, subjecting the assembly to heat and pressure to vulcanize vulcanizable components thereof, and finally removing the mandrel axially through one of the sections.

2. The method of forming a splice as defined in claim 1 which includes disposing the successive rubber impregnated fabric layers relatively to the axis of the mandrel alternating in such positions that the direction of greatest tensile strength of the fabric in each layer extends alternately in successive wrappings at positive and negative angles of approximately 54° to said axis.

3. In a method of splicing together the ends of two sections of multiple ply rubber impregnated fabric reinforced discharge hose, the steps of preparing the section ends for splicing by removing from each for an appreciable distance back from its end the outermost layer of material, then removing the successively inner plies of fabric reinforcement for progressively less distances from said end until the innermost unreinforced lining is exposed for an appreciable distance from its end, bringing the section ends together in abutting axially aligned relation, bonding the abutting ends of said innermost linings together, enclosing said ends within a plurality of layers of rubber impregnated fabric corresponding in number at least to the number of fabric reinforcing plies in the sections, said rubber impregnated fabric comprising warp and filler yarns disposed normal to each other and differing substantially in tensile strength, the warp yarns in successive layers extending respectively at positive and negative angles of approximately 54° to the common axis of the section ends, and vulcanizing the rubber fabric impregnated to thereby permanently bond it to the sections.

References Cited in the file of this patent
UNITED STATES PATENTS

| | | |
|---|---|---|
| 680,504 | Shepard et al. | Aug. 13, 1901 |
| 1,438,370 | Fisher | Dec. 12, 1922 |
| 2,511,330 | Custer | June 13, 1950 |
| 2,693,223 | Krupp | Nov. 2, 1954 |
| 2,737,466 | Utermohlen et al. | Mar. 6, 1956 |
| 2,801,452 | Adams | Aug. 6, 1957 |
| 2,822,856 | Waugh | Feb. 11, 1958 |
| 2,827,412 | McKay | Mar. 18, 1958 |